March 16, 1971  G. L. TURNER  3,570,079
HOSE CLAMP

Filed May 15, 1969  2 Sheets-Sheet 1

INVENTOR
GEORGE L. TURNER
BY Roy A. Plant
ATTORNEY

March 16, 1971      G. L. TURNER      3,570,079

HOSE CLAMP

Filed May 15, 1969      2 Sheets-Sheet 2

INVENTOR
GEORGE L. TURNER

BY Roy A. Plant

ATTORNEY

United States Patent Office 3,570,079
Patented Mar. 16, 1971

3,570,079
HOSE CLAMP
George L. Turner, Hickory Corners, Mich., assignor to American Stamping Co., Battle Creek, Mich.
Filed May 15, 1969, Ser. No. 824,961
Int. Cl. B65d 63/02
U.S. Cl. 24—278
12 Claims

ABSTRACT OF THE DISCLOSURE

This hose clamp is of a type to be made in various fixed sizes to fit and clamp various specific diameters of hose or the like. The ends of the hose clamp strap overlap each other and are fixedly held in that relative position in various ways on an externally threaded, side grooved, floating nut. That nut in turn engages the threads in an internally threaded nut, so that with the floating nut and its anchored clamp strap mounted in place on the piece of hose which is to be gripped on a male member, the rotation of the internally threaded nut in engagement with the externally threaded floating nut will pull the two end portions of the strap up into the internally threaded nut and tighten the strap on the hose.

BACKGROUND OF THE INVENTION

This invention relates broadly to clamping devices and more particularly to the type known as hose clamps which are used to anchor automobile radiator hose in place under conditions of use, as well as garden hose and hose used for other items such as automatic washing machine hose, and the like. Previously used hose clamps have been in various forms such as the heavy steel spring wire clamps with overlapping outturned ends which are mounted and dismounted with a tong-like tool which operates like a pair of pliers such that by squeezing the outturned ends of the clamps toward each other this expands the size of the clamp to make possible releasing same from gripping the hose so that the clamp can be moved as needed for mounting or removing same from the hose it is to anchor in place under operating conditions. Another type of hose clamp which has been in use for a longer period of time is of heavy section band type with both an overlapping portion and an outturned portion on each end with the outturned portion perforated for receiving a stove bolt tangentially of the band end portion for tightening the hose clamp in place. This type of hose clamp has been more recently made out of wire, but operating on the same tightening principle. Other constructions have involved placing uniformly spaced cross slots in the band portion of the clamp and using a holding member with coarse threaded screw which engages these slots and uses them as threads for tightening the hose clamp in place.

These previous constructions, some of which worked very satisfactorily, have had various drawbacks such as being complex, weak and subject to breakage, and frequently costly or difficult for the untrained to use. It was a recognition of the commercial need of a more simplified, and easy to use, low-cost hose coupling which led to the conception and development of the present invention.

SUMMARY OF THE INVENTION

Accordingly, among the objects of the present invention is the provision of a highly simplified, easy to manufacture and easy to use hose coupling, which is strong, efficient, and of low cost.

Another object is to provide a hose clamp, the ends of which can be anchored together on an externally threaded, side grooved floating nut, with an internally threaded nut threadedly engaging said externally threaded nut, so that with said hose clamp in place in clamping position, rotation of the internally threaded nut will move said externally threaded nut into said internally threaded nut and pull the ends of the strap portion of said hose clamp up into same, thus decreasing the diameter of the strap portion of the hose clamp and tightening same in place on the hose to be clamped.

Another object is to provide means for anchoring the ends of the strap member to the floating nut for movement in unison with same.

A further object is to provide a new hose clamp mounting and dismounting method.

Still further objects and advantages of the invention will appear as the description proceeds.

To the accomplishment of the foregoing and related ends, the invention, then, consists of the clamping means and/or features hereinafter fully described and particularly pointed out in the claims, the annexed drawings and the following description setting forth in detail certain illustrative hose clamp embodiments of my new invention, such embodiments illustrating, however, but several of the various ways in which the principle of the invention may be used.

DESCRIPTION OF THE PREFERRED EMBODIMENTS

Referring more particularly to FIGS. 1 to 10, inclusive, it will be noted that the hose clamp assembly 10 consists of three parts, namely the strap 11, side grooved floating nut 12, and an internally threaded nut 13 for threadedly engaging floating nut 12, all of which are assembled and used together as hereinafter set forth.

Figure 6:
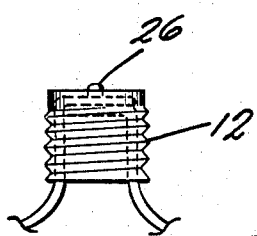
FIG. 6 is a fragmentary side view of the hose clamp strap ends mounted on the floating nut ready for heading, as seen along line VI—VI of FIG. 4, looking in the direction of the arrows.
Figure 4:
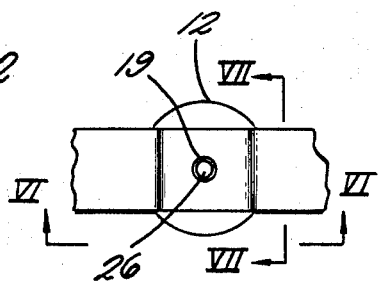
FIG. 4 is a fragmentary top view of the FIG. 3 elements loosely assembled.
Figure 5:
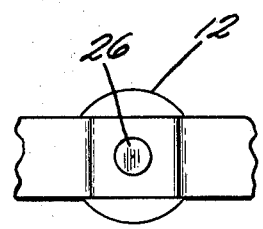
FIG. 5 is a fragmentary top view of the FIG. 4 combination with the projecting end member of the floating nut headed over to anchor the floating nut and strap end parts together in fixed relation.
Figure 7:
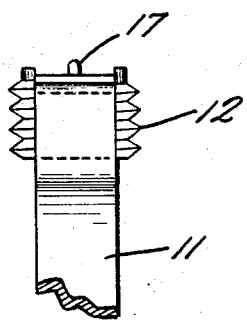
FIG. 7 is a fragmentary view of the hose clamp strap ends mounted on the floating nut ready for heading, as seen along line VII—VII of FIG. 4, looking in the direction of the arrows.
Figure 3:
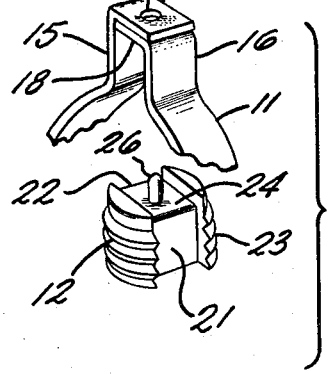
FIG. 3 is a fragmentary partial perspective view showing in exploded form the ends of the hose clamp strap in overlapped position and one form of floating nut ready to be assembled with same.
Figure 8:
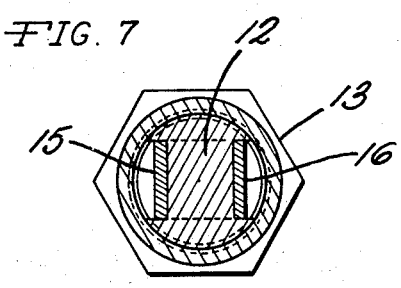
FIG. 8 is an enlarged sectional view as taken along line VIII—VIII of FIG. 1, looking in the direction of the arrows.

As shown in FIG. 3, the ends of strap 11, which is preferably made of annealed stainless steel, are bent outward to form substantially parallel extensions 15 and 16. These extensions 15 and 16 in turn have their free ends bent inward to form overlapping ears 17 and 18, with those ears in a preferred form of the invention being provided with aligned perforations 19. The externally threaded nut 12 is provided with side grooves 21 and 22 of a depth to allow extension 15 or 16 to fit in same and clear the bottom of threads 23 so as to not interfere with the threaded engagement of floating nut 12 with nut 13. Nut 12 is preferably provided with a cross groove 24 of the same width as grooves 21 and 22. This cross groove 24 in preferred form having a unitary post 26 projecting centrally thereof, with said post being a little smaller in diameter than perforations 19, and a little longer than double the thickness of strap 11, so that when initially assembled on strap 11 its end will project as shown in FIGS. 4, 6 and 7, to permit riveting as shown in FIG. 5 to anchor the strap ears 17 and 18 to floating nut 12.

Figure 2:
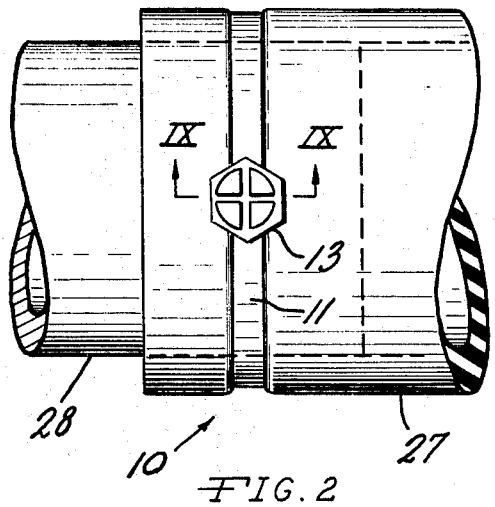
FIG. 2 is a top view of the hose clamp assembly of the present invention in mounted and tightened position.
Figure 1:
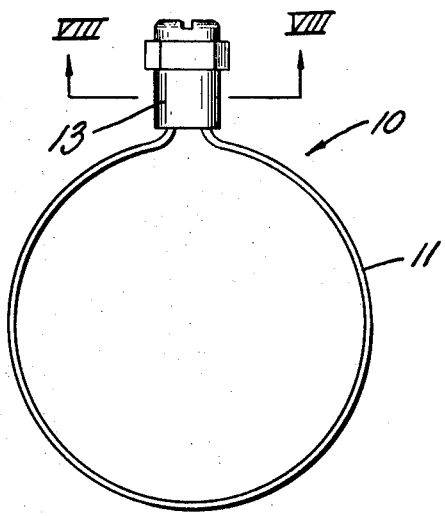
FIG. 1 is an edge view of the hose clamp assembly of the present invention.
Figure 10:
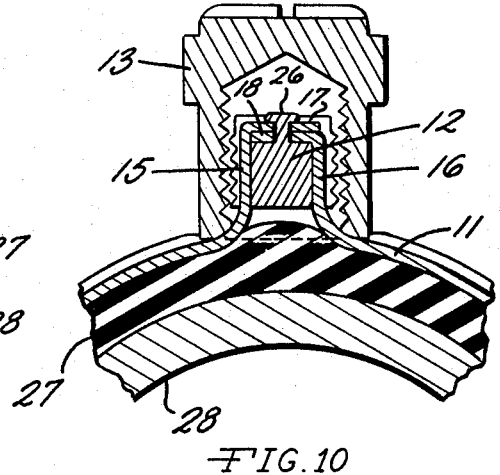
FIG. 10 is a fragmentary sectional view as taken along line X—X of FIG. 9, looking in the direction of the arrows.

With floating nut 12 thus anchored to the ends of strap 11 of predetermined length, this combination is ready to be mounted on a corresponding size hose end 27, FIG. 2, mounted on the end of a piece of tubing or the like 28, so that by engaging nut 12 with an internally threaded, smooth rounded bottom nut 13, and tightening the latter it will draw the end portions of strap 11 up into nut 13 which is preferably approximately twice as deep as floating nut 12 is long, and tighten the strap 11 on hose end 27, as shown. It is thus to be seen that a highly simplified low-cost, hose clamp is involved, and wherein the strap 11 is not weakened by perforations or threads in the highly stressed area where the strap passes into the open bottom of nut 13 under hose clamp tightening conditions. It is to be noted that the bottom edge of nut 13 acts to seal the clamp to the hose in the space below floating nut 12 between extensions 15 and 16 of strap 11, as shown in FIG. 10.

Figure 9:
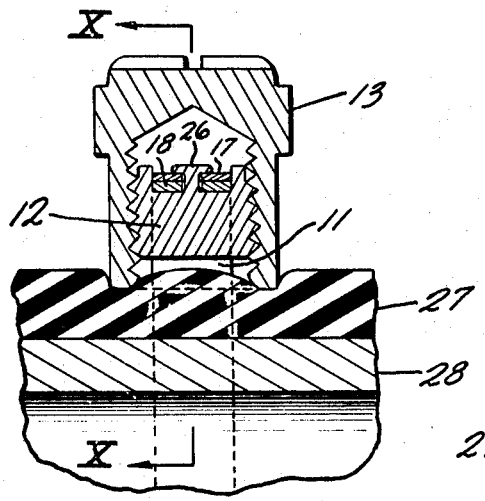
FIG. 9 is an enlarged fragmentary sectional view as taken along line IX—IX of FIG. 2, looking in the direction of the arrows.
Figure 12:
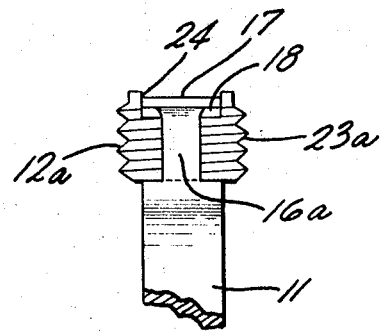
FIG. 12 is a fragmentary sectional view as taken along line XII—XII of FIG. 11, looking in the direction of the arrows.
Figures 11, 13:
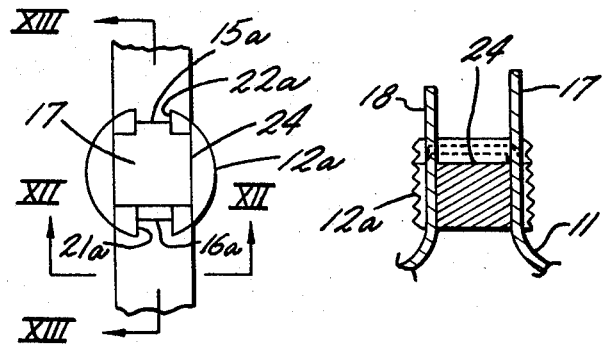
FIG. 11 is a fragmentary top view of a modified construction for joining the strap ends to the floating nut.
FIG. 13 is a fragmentary sectional view as taken along line XIII—XIII of FIG. 11, looking in the direction of the arrows, with the ends of the strap shown in solid lines ready to be bent down into anchored overlapping position, which is shown in dotted lines.

A modified construction is shown in FIGS. 11, 12 and 13 where the extensions 15a and 16a are side notched and moderately narrower to provide more threads 23a on nut 12a due to making side grooves 21a and 22a moderately narrower than shown in FIG. 3 (with a ⁵⁄₁₆ inch band, notches approximately ¹⁄₃₂ inch to ³⁄₆₄ inch deep in strap 11 woul be satisfactory) while leaving ears 17 and 18 full width to fit a full width cross groove 24 so that when ears 17 and 18 are bent down as shown, and nut 13 is in place the ears will be locked aginst movement out of position over cross groove 24. This construction avoids the need of a post 26, FIG. 3, and perforations 19, as well as the riveting of the end of post 26 as shown in FIGS. 5, 9, and 10, while leaving strap 11 of full width for strength in the area engaging the bottom of nut 13, said bottom preferably being smooth and rounded to facilitate sliding said strap over same.

Figure 14:
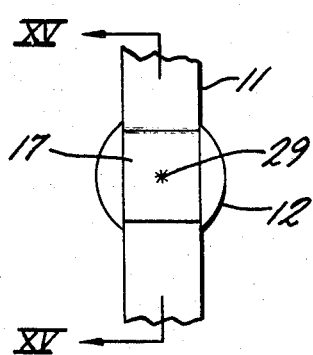
FIG. 14 is a fragmentary top view of a modified form of the strap and floating nut combination where the overlapping strap ends are spot welded together.
Figure 15:
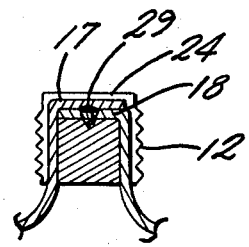
FIG. 15 is a fragmentary sectional view as taken along line XV—XV of FIG. 14, looking in the direction of the arrows, with the strap ends and floating nut all spot welded together.

A second modification of the hose clamp assembly of FIGS. 1 to 10, inclusive, is shown in FIGS. 14 and 15. Here the ends or ears 17 and 18 are spot welded 29 together either by themselves before mounting on nut 12 or preferably after mounting on nut 12, FIG. 15, so that nut 12 and strap 11 are held together as a unit ready for engagement with internally threaded, smoothly rounded bottom, nut 13, as previously described, ready for tightening on a piece of hose 27 to anchor same to a tube 28 tightly fitting into same. This form also eliminates the need for a post 26 and perforations 19, FIG. 3.

While preferred embodiments of the hose clamp have been illustrated and described herein, it is to be understood that modifications can be made in the tightening portion of the hose clamp within the spirit and scope of the invention, as herein described and illustrated. It is also to be noted that while directional terms have been used, same are not to be construed as a limitation of the invention since such use has been availed of to better describe the invention as illustrated in the drawings.

I therefore particularly point out and distinctly claim as my invention:

1. A hose clamp, comprising in combination a flexible strap, an externally threaded floating nut which has grooves on opposite sides thereof to receive a portion of said strap adjacent each end of same, a smoothly rounded bottom, internally threaded, nut fitting the threads on said floating nut, and means for anchoring the ends of said strap to said floating nut.

2. A hose clamp as set forth in claim 1, wherein said floating nut is also cross grooved at its top in alinement with said side groves, and said strap ends overlap each other in said cross groove.

3. A hose clamp as set forth in claim 2, wherein said floating nut has in said cross grooved top, a substantially centrally located and upward extending post, with said strap ends overlapping each other and perforated in alinement to receive said post, means conventionally anchoring said strap ends to said post in position to fit into said internally threaded nut, whereby operatively rotating said last named nut to move said floating nut and the strap ends connected thereto up into said internally threaded nut will reduce the amount of said strap extending out of said nut with resultant tightening of said hose clamp.

4. A hose clamp as set forth in claim 2, wherein said side grooves of the floating nut are moderately narrower than the full width of said strap, and wherein said strap has shallow side notches full length of said side grooves to fit into and be held by the latter, the end portion of each end of said strap beyond and starting at the end of said notch extending sidewise over the cross grooved top of said floating nut to help stabilize and hold the strap on said floating nut.

5. A hose clamp as set forth in claim 2, wherein the means for anchoring said strap to said floating nut, comprises a spot weld which anchors the overlapped ends of said strap together and to said floating nut within the top cross groove of same.

6. A hose clamp as set forth in claim 1, wherein said floating nut has a substantially centrally located, upwardly extending post, said strap end portions have their free ends overlapping each other at the top of said floating nut, said overlapping ends each having a hole therethrough with the end of said post extending through same, whereby threadedly engaging said internally threaded nut with said floating nut and operatively rotating same in tightening direction will draw the ends of said strap up into said internally threaded nut and tighten said hose clamp.

7. A hose clamp as set forth in claim 1, wherein said side grooves of the floating nut are moderately narrower than the full width of said strap, and wherein said strap has shallow side notches the full length of said side grooves to fit into and be held by the latter, the end portion of each end of said strap beyond and starting at the end of said notch extending sidewise over the top of said floating nut to help stabilize and hold the strap on said floating nut.

8. A hose clamp as set forth in claim 1, wherein the means for anchoring the ends of said strap to said floating nut comprises a spot weld which anchors the ends of said strap to said floating nut at the top of the latter.

9. The method of making and assembling a hose clamp of the character described, which comprises forming an externally threaded floating nut with alined side and top grooves, forming a metal strap of predetermined length for the size hose clamp to be made, forming overlapping ears on the ends of said strap to fit substantially the full length of said top groove of said floating nut, forming substantially parallel extensions of said strap from said ears to fit substantially the full length of said side grooves in said floating nut, forming an internally threaded nut for threadedly fitting said floating nut from its cross grooved top end, engaging said floating nut with said internally threaded nut, providing said internally threaded nut with a smooth bottom edge and making same of a depth such that the by tightening same to move said floating nut up into same along with the ends of said strap, a further portion of strap beyond said extensions will be pulled into said nut, said hose clamp will be tightened.

10. The method of making and assembling a hose clamp as set forth in claim 9, including the step of anchoring the end portions of said strap to said floating nut.

11. The method of tightening in place a hose clamp having a strap and externally threaded floating nut, which comprises fastening the ends of said strap to said nut, placing said strap closely around the item to be clamped, and placing an internally threaded nut over the threads of said floating nut and rotating said internally threaded nut, thereby moving said floating nut and strap ends away from said item to be clamped while holding the portions of said strap adjacent said strap ends and extending substantially to said item to be clamped, in substantially parallel position.

12. The method of tightening a hose clamp as set forth in claim 11, which includes bending the ends of said strap over the top of said nut, and then fastening said ends to the top of same.

References Cited

UNITED STATES PATENTS

| | | | |
|---|---|---|---|
| 1,584,332 | 5/1926 | Tetzlaff | 24—278 |
| 2,391,235 | 12/1945 | Hathorn | 24—278 |
| 2,673,383 | 3/1954 | Calder | 24—278 |
| 3,061,339 | 10/1962 | Jewell | 24—278X |

FOREIGN PATENTS

| | | | |
|---|---|---|---|
| 1,267,330 | 6/1961 | France | 24—278 |

DONALD A. GRIFFIN, Primary Examiner